United States Patent
Hargabus

[11] Patent Number: 5,810,465
[45] Date of Patent: Sep. 22, 1998

[54] INFINITY MIRROR DISPLAY

[76] Inventor: Patrick A. Hargabus, 4447 Rayfield Dr., Sarasota, Fla. 34243

[21] Appl. No.: 726,031

[22] Filed: Oct. 4, 1996

[51] Int. Cl.⁶ ...................................................... F21V 9/16
[52] U.S. Cl. .............................. 362/84; 362/30; 362/135; 362/140; 362/260; 362/293; 40/219; 40/543
[58] Field of Search ............................. 40/219, 542, 543, 40/582, 900; 362/23, 29, 30, 84, 135, 140, 230, 260, 304, 305, 811, 812, 293; 368/67, 227; 472/63

[56]  References Cited

U.S. PATENT DOCUMENTS

| | | | |
|---|---|---|---|
| 2,213,868 | 9/1940 | Lucian | 40/543 |
| 2,455,951 | 12/1948 | Roper et al. | 362/84 |
| 2,594,903 | 4/1952 | Freedman et al. | 362/84 |
| 2,790,350 | 4/1957 | Cameron | 362/135 |
| 2,981,827 | 4/1961 | Orsatti et al. | 362/84 |
| 3,510,976 | 5/1970 | Pauline et al. | 40/542 |
| 3,828,611 | 8/1974 | Shamlian et al. | 362/84 |
| 4,139,955 | 2/1979 | Reiback | 40/219 |
| 4,424,449 | 1/1984 | O'Brill | 40/543 |
| 4,991,537 | 2/1991 | Muramatsu | 362/84 |
| 5,232,388 | 8/1993 | Danjell | 40/543 |
| 5,398,170 | 3/1995 | Lee | 362/84 |

Primary Examiner—Alan Cariaso
Attorney, Agent, or Firm—Charles J. Prescott

[57]  ABSTRACT

A light display in which black or ultraviolet radiant energy or "black" light or black light blue is introduced between a totally reflective mirror and a partially reflective or one-way mirror. The ultraviolet light impinges upon an object positioned between the two mirrors which is either fabricated or molded at least in part by fluorescent plastic or coated or impregnated with a fluorescent paint or dye. The object then emits visible light which is incident upon the fully reflective mirror to reflect back at the object and the partially reflective mirror to create an infinity mirror effect of the fluorescent object.

6 Claims, 2 Drawing Sheets

INFINITY MIRROR DISPLAY

BACKGROUND OF THE INVENTION

1. Scope of Invention

This invention relates generally to visual light displays and infinity mirror displays, and more particularly to such a device which utilizes ultraviolet, "black" light, or "black light blue" which impinges upon a fluorescent or illuminescent object.

2. Prior Art

The infinity mirror effect is easily observed by placing an object between spaced opposing facing mirrors such as in a room. The object will be visually repeated endlessly when observing one of the mirrors with each new repeated image being somewhat smaller and appearing further away from an observer standing between the mirrors. This principle is applied in my earlier U.S. Pat. No. 4,761,004 which teaches an infinity mirror display having spaced fully reflective and partially reflective mirrors between which a light source is introduced such as from an incandescent bulb. A more recent patent issued to Rush in U.S. Pat. No. 5,136,492 teaches the utilization of a neon tube as a self-illuminating object placed between fully reflective and partially respective spaced mirrors.

A number of other prior art disclosures also disclose devices which take advantage of the infinity mirror principle as follows: U.S. Pat. Nos.

| | |
|---|---|
| 1,750,994 | Dorman |
| 2,056,383 | Benway |
| 2,114,711 | Horinstein |
| 2,132,472 | Holm |
| 2,188,677 | Dickinson |
| 2,286,246 | Yearta |
| 2,286,247 | Yearta |
| 2,579,230 | Giboney |
| 2,790,350 | Cameron |
| 4,139,955 | Reiback |
| 4,417,411 | Miyagishima, et al. |

Near-ultraviolet radiant energy, i.e. energy not visible to the human eye, also known as "black light", causes certain materials to fluoresce or emit visible light. The normal human eye is sensitive only to radiant energy between 400 and 700 nanometers in wavelength. Near-ultraviolet or black light is below that visible range and lies in the wavelength range of 320 to 380 nanometers.

The term "black light" is quite descriptive since true ultraviolet energy in this wavelength range cannot be seen by the human eye, but the effects of such light on special materials can be visually dramatic. When black light is directed at a fluorescent material, an energy conversion takes place. The material or chemical sensitive to ultraviolet energy absorbs the energy and then radiates it in longer wave length in the visible wave length range. However, Applicant is unaware of any light display or infinity mirror devices which utilize black light to cause an object within the device to fluoresce and emit visible light for observance.

BRIEF SUMMARY OF THE INVENTION

This invention is directed to a light display in which ultraviolet radiant energy or "black" light is introduced between a totally reflective mirror and a partially reflective or one-way mirror. The ultraviolet light impinges upon an object positioned between the two mirrors which is either fabricated at least in part by fluorescent plastic or coated with a fluorescent or illuminating paint or dye. The object then emits visible light which is incident upon the fully reflective mirror to reflect back at the object and the partially reflective mirror to create an infinity mirror effect of the fluorescent object.

It is therefore an object of this invention to provide an infinity mirror which utilizes a source of ultraviolet, black light, or black light blue, which may be unseen in and of itself, but which causes an object to fluoresce and then to emit viewable light.

It is another object of this invention to provide a light display which utilizes an object which will fluoresce and provide a unique visual display when acted upon by a source of ultraviolet light.

It is yet another object of this invention to provide an infinity mirror which includes a fluorescent object positioned between a fully reflective and a partially reflective spaced mirrors and includes a black light source which causes the object to fluoresce and produce unique visual light and reflected light effects.

In accordance with these and other objects which will become apparent hereinafter, the instant invention will now be described with reference to the accompanying drawings.

DETAILED DESCRIPTION OF THE INVENTION

Figure 1:
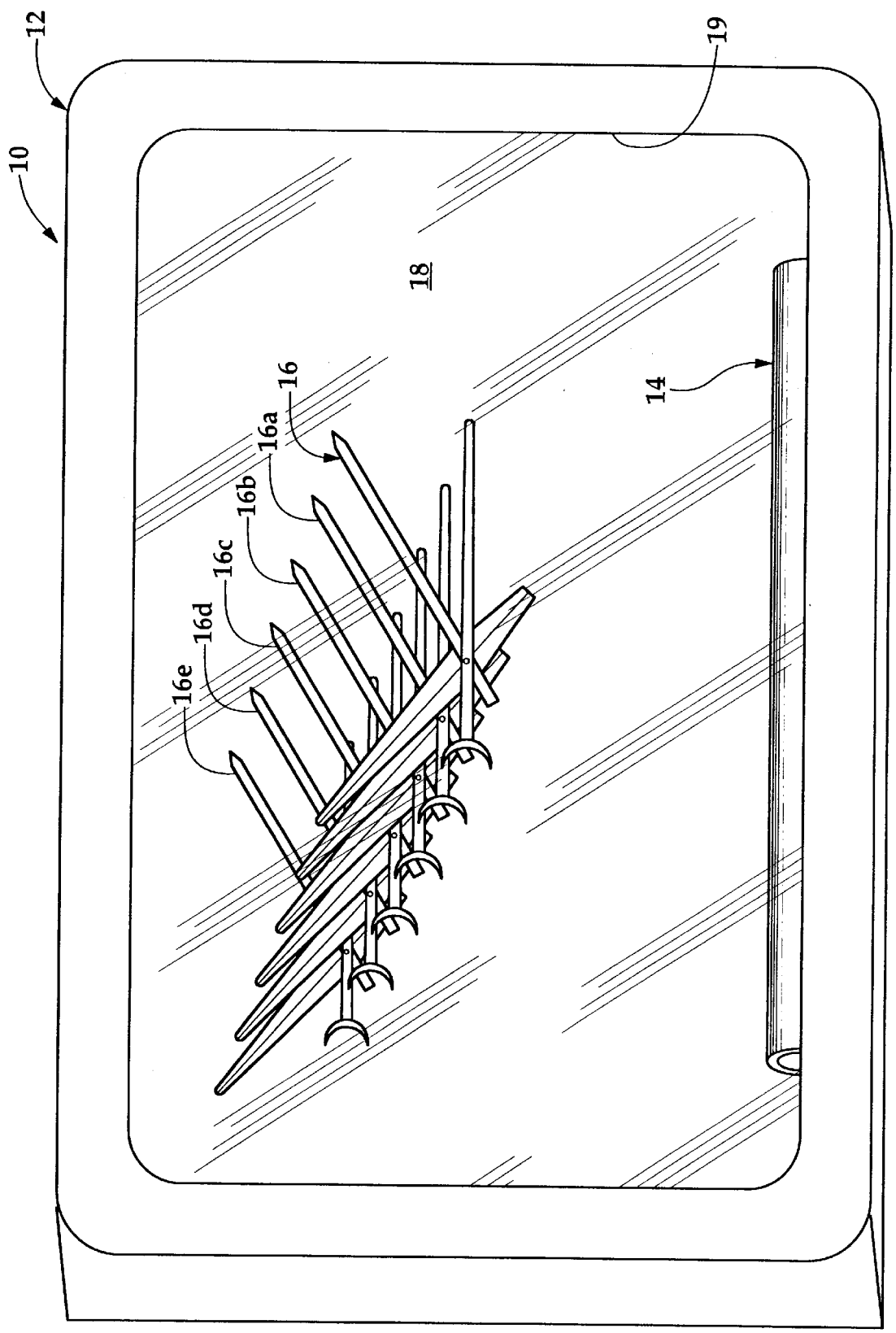
FIG. 1 is a perspective view of the preferred embodiment of the invention.
Figure 2:
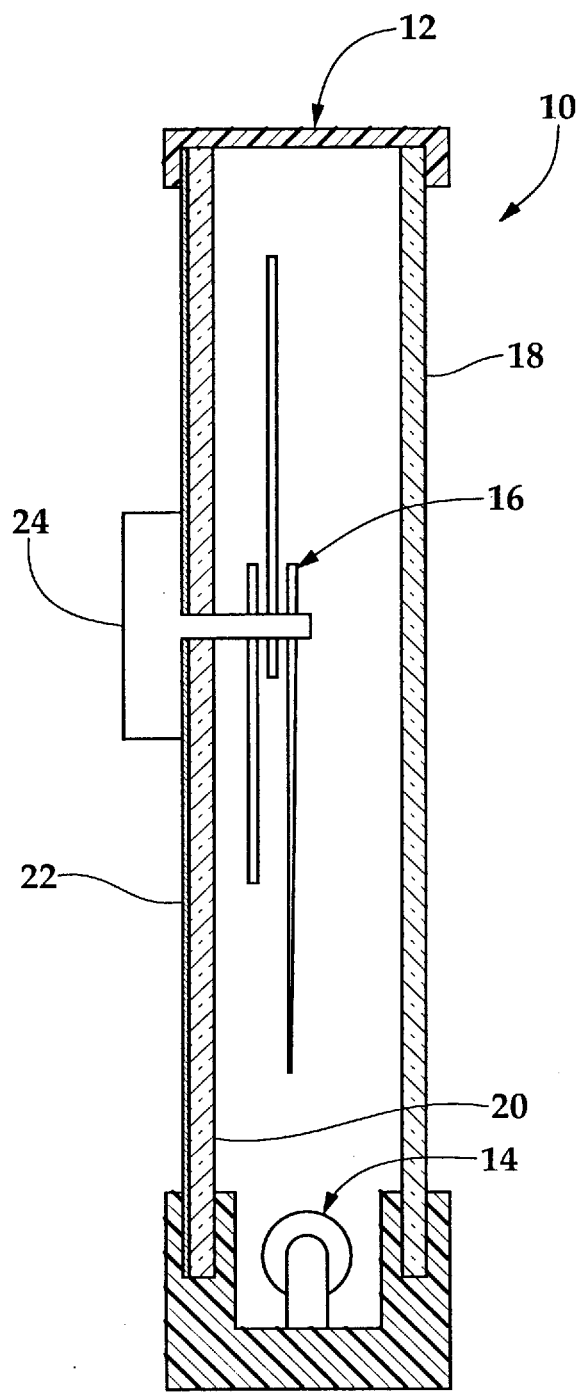
FIG. 2 is a simplified vertical section view centrally through FIG. 1.

Referring now to the drawings, the preferred embodiment of the invention is generally shown at numeral 10 in FIGS. 1 and 2. This device is in the form of a light display or infinity mirror display and includes a plastic molded frame 12 having a front opening 19 defining a viewing area and supporting a first mirror 18 within the viewing area and a second spaced parallel mirror 20. Mirror 18 is a partially reflecting type also known as a two-way mirror. In the absence of light from behind, the mirror 18 would appear to be substantially reflective. When a light source is placed behind mirror 18, however, light is transmitted therethrough for observance through the viewing area of the frame 12. The second mirror 20 is fully reflective and includes a reflecting surface 22 such as a conventional silvered mirror surface.

In this preferred embodiment 10, conventionally shaped clock hands 16 powered by a clock mechanism 24 is positioned connected centrally through the second mirror 20. The hands of the clock 16 are preferably fabricated from fluorescent or illuminating plastic which becomes fully illuminated in the presence of ultraviolet light. An ultraviolet light source 14 is positioned near the lower interior portion of the frame 12 as shown. By this arrangement, when the ultraviolet source 14 is activated, ultraviolet light is emitted which is not generally visible to the human eye. However, as it impinges upon the clock hands 16, the fluorescent plastic of the hands emit visible light.

As best seen in FIG. 1, the hands of the clock 16 emit visible light which is incident upon the second mirror 20 and is reflected to be incident upon the first mirror 18 and the fluorescent hands of the clock 16. As a result, successive images of the hands at 16*a* to 16*e* in endless fashion may be observed through the viewing area 19 of frame 12.

As an alternate to fabricating the hands of the clock 16 of a fluorescent plastic, a fluorescent dye or paint may be applied directly onto the surface of the clock hands. However, the uniquely visually distinct benefit of glowing fluorescent plastic of the preferred embodiment above described is somewhat lost in that only the surface of the painted or surface dyed hands become fluorescent to emit visible light produced from the impinging black light source.

Figure 3:
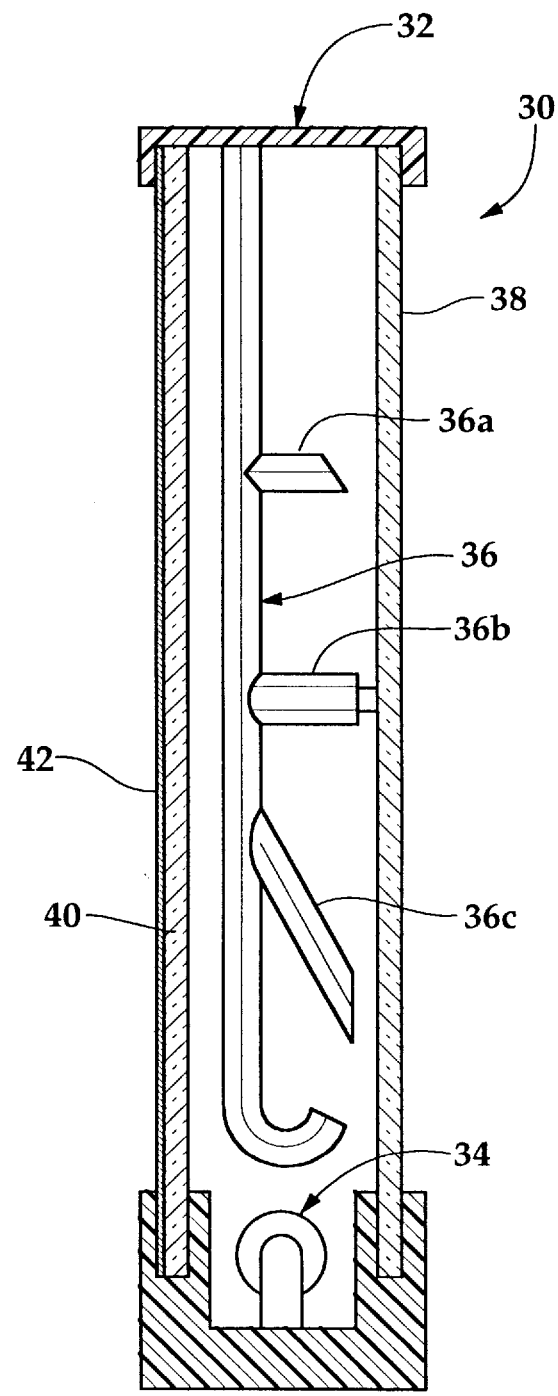
FIG. 3 is a section view similar to FIG. 2 of another embodiment of the invention.

Another embodiment of the invention is shown in FIG. 3 generally at numeral 30. This embodiment 30 also includes a frame 32 which supports a front partially reflective mirror 38 and spaced parallel fully reflective second mirror 40, made fully reflective by the silvered surface 42. Again, a black light or ultraviolet light source 34 is provided disposed along the lower margin of the interior of the frame in this embodiment, but may be positioned anywhere within the space between the two mirrors.

In this embodiment 30, a randomly configured object 36 formed of fluorescent or illuminating plastic is disposed between the first and second mirrors 38 and 40, respectively, and includes a variety of object portions at 36*a,* 36*b,* and 36*c,* all of which, when exposed to ultraviolet light from the light source 34 will glow both from its surface and interiorly to produce a unique infinity mirror effect between the first and second mirrors 38 and 40, respectively.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An infinity mirror display comprising:

a frame having a front opening defining a viewing area;

first and second mirrors;

said first mirror being partially reflecting and mounted in said frame adjacent to said front opening and displayed in said viewing area;

said second mirror having a fully reflecting surface on one side and mounted in said frame spaced from said first mirror with said fully reflecting surface spaced furthest from said first mirror;

means for producing ultraviolet black light between said first and second mirrors, said black light having a wave length in a range of about 320 to 380 nanometers;

an object positioned between said first and second mirrors which becomes illuminated to emit visible light having a wave length of at least about 400 nanometers in the presence of said black light.

2. An infinity mirror display as set forth in claim 1, wherein:

said object includes an illuminating fluorescent plastic.

3. An infinity mirror display as set forth in claim 1, wherein:

said object includes a fluorescent coating.

4. A light display comprising:

an ultraviolet radiant energy source;

a first panel member having a partially reflective surface;

a second panel member having a reflective surface;

an object positioned between said first and second panel members which emits visible light when struck by ultraviolet radiant energy from said ultraviolet radiant energy source;

said second panel being adapted to reflect at least a portion of incident visible light emitted from said object back toward said object and said first panel member.

5. An infinity mirror display as set forth in claim 4, wherein:

said object includes an illuminating fluorescent plastic.

6. An infinity mirror display as set forth in claim 4, wherein:

said object includes a fluorescent coating.

\* \* \* \* \*